United States Patent
Beach et al.

(10) Patent No.: US 6,647,796 B2
(45) Date of Patent: Nov. 18, 2003

(54) SEMICONDUCTOR NITRIDE PRESSURE MICROSENSOR AND METHOD OF MAKING AND USING THE SAME

(75) Inventors: Robert A. Beach, Altadena, CA (US); Robert P. Strittmatter, Pasadena, CA (US); Thomas C. McGill, Pasadena, CA (US)

(73) Assignee: California Institue of Technology, Pasadena, CA (US)

( * ) Notice: Subject to any disclaimer, the term of this patent is extended or adjusted under 35 U.S.C. 154(b) by 0 days.

(21) Appl. No.: 09/923,628

(22) Filed: Aug. 7, 2001

(65) Prior Publication Data

US 2002/0066319 A1 Jun. 6, 2002

Related U.S. Application Data

(60) Provisional application No. 60/224,923, filed on Aug. 11, 2000.

(51) Int. Cl.[7] .................................................. G01L 9/00
(52) U.S. Cl. .............................. 73/754; 73/720; 73/726; 257/254
(58) Field of Search .................... 73/754, 720, 723, 73/726, 777, 703, 727, 721; 257/26, 254, 419, 28

(56) References Cited

U.S. PATENT DOCUMENTS

| | | | | |
|---|---|---|---|---|
| 3,772,628 A | * | 11/1973 | Underwood et al. | 338/4 |
| 4,784,721 A | * | 11/1988 | Holmen et al. | 156/647 |
| 5,191,237 A | * | 3/1993 | Takebe | 257/419 |
| 5,209,119 A | * | 5/1993 | Polla et al. | 73/723 |
| 5,279,162 A | * | 1/1994 | Takebe et al. | 73/726 |
| 5,511,428 A | * | 4/1996 | Goldberg et al. | 73/777 |
| 5,578,843 A | * | 11/1996 | Garabedian et al. | 257/254 |
| 6,128,961 A | * | 10/2000 | Haronian | 73/774 |
| 6,431,005 B1 | * | 8/2002 | Delaye | 73/724 |

* cited by examiner

*Primary Examiner*—Andrew H. Hirshfeld
*Assistant Examiner*—Marissa Ferguson
(74) *Attorney, Agent, or Firm*—Daniel L. Dawes; Myers Dawes Andras & Sherman LLP

(57) ABSTRACT

An integrated microsensor includes a bowed micromachined membrane coupled to a substrate to define a microcavity therebetween. An integrated strain sensor is coupled to the micromachined membrane to generate a signal responsive to (deformation of the membrane and hence responsive to the pressure of the fluid in the microcavity. A frame is coupled to the peripheral edge of the membrane to assist in enlarging the microcavity. The membrane is composed of a nitride of B, Al, Ga, In, Tl or combinations thereof, or more particularly of p-type GaN where the frame is comprised of n-type GaN. The membrane and frame are fabricated using a photoelectrochemical etching technique. The fabrication of the integrated strain sensor creates stresses across the membrane. The strain sensor comprises an integrated circuit strain-FET. The strain-FET comprises an AlGaN/GaN heterostructure having an AlGaN/GaN interface where deformation of the membrane is coupled as strain to the AlGaN/GaN piezoelectric interface.

10 Claims, 2 Drawing Sheets

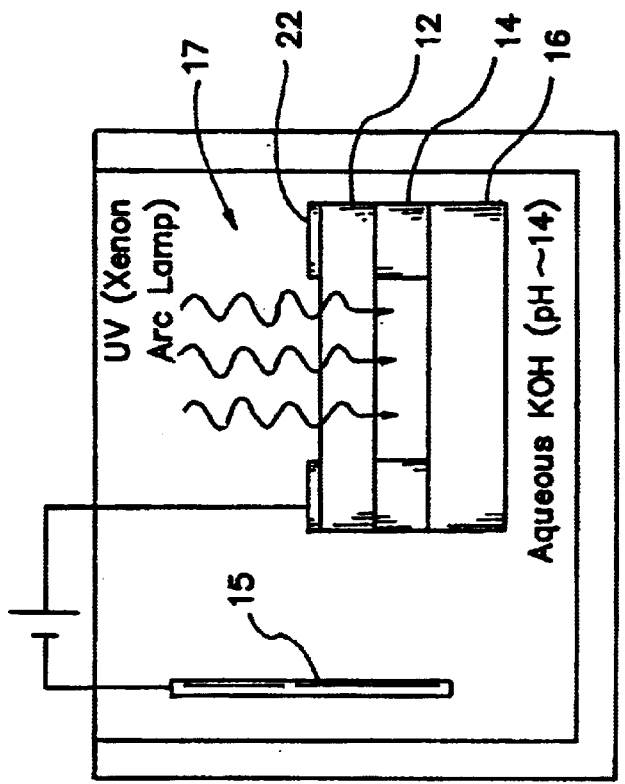
FIG. 3D
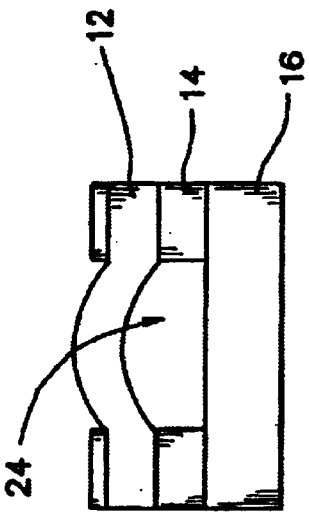
FIG. 3E
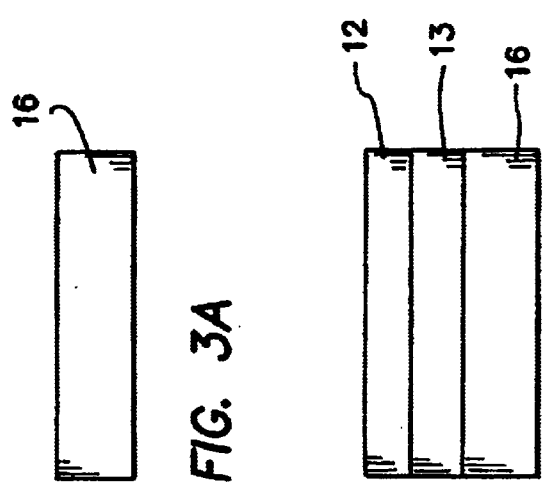
FIG. 3A
FIG. 3B
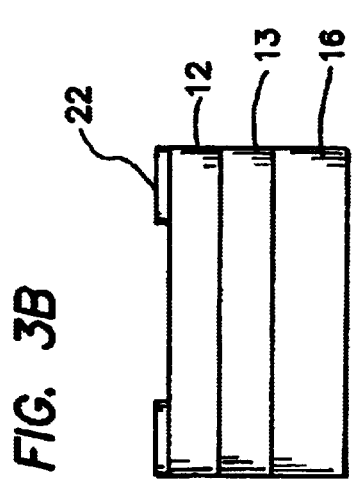
FIG. 3C

SEMICONDUCTOR NITRIDE PRESSURE MICROSENSOR AND METHOD OF MAKING AND USING THE SAME

RELATED APPLICATIONS

The present application is related to U.S. Provisional patent application serial No. 60/224,923 filed on Aug. 11, 2000.

GOVERNMENT SPONSORED RESEARCH

The U.S. Government has a paid-up license in this invention and the right in limited circumstances to require the patent owner to license others on reasonable terms as provided for by the terms of Grant No. N00014-99-1-0972 awarded by the Office of Naval Research.—The U.S. Government has a paid-up license in this invention and the right in limited circumstances to require the patent owner to license others on reasonable terms as provided for by the terms of Grant No. N00014-99-1-0972 awarded by the Office of Naval Research.

BACKGROUND OF THE INVENTION

1. Field of the Invention

The invention relates to the field of micromachined pressure sensors and in particular to column III nitride or GaN sensors.

2. Description of the Prior Art

The micromachining of membranes which are reliably fabricated to provide an electromechanical means of providing a measurement of pressure has been limited by micromachining fabrication techniques. Large $1\mu$ membranes are needed which have a deformability sufficient to generate strains which are sensible by strain FET's. These are difficult to fabricate at the sizes and deformation characteristics needed.

BRIEF SUMMARY OF THE INVENTION

The invention is an integrated microsensor for sensing pressure of a fluid comprising a bowed micromachined membrane having a peripheral edge. A substrate is coupled to at least a portion of the peripheral edge to define a microcavity between the substrate and membrane. The pressure of the fluid in the microcavity is to be sensed. An integrated strain sensor is coupled to the micromachined membrane to generate a signal responsive to deformation of the membrane and hence responsive to the pressure of the fluid in the microcavity.

The membrane is composed of a nitride of B, Al, Ga, In, Tl or combinations thereof. In the illustrated embodiment the membrane is comprised of p-type GaN.

The strain sensor comprises an integrated circuit strain sensor or strain-FET fabricated in an integrated manner with the membrane and substrate. The strain-FET comprises an AlGaN/GaN heterostructure having an AlGaN/GaN interface where deformation of the membrane is coupled as strain to the AlGaN/GaN interface.

The integrated microsensor further comprises a frame coupled to the peripheral edge of the membrane and where the frame is coupled to the substrate, wherein the frame assists in enlarging the microcavity. In the embodiment where the membrane is comprised of p-type GaN and the frame is comprised of n-type GaN. The micromachined membrane and frame are fabricated using a photoelectrochemical etching technique. The membrane is bowed by fabrication of the integrated strain sensor thereon to create stresses across the membrane.

Alternative chemistries or choices of etchants and doped nitrides can be used to form both p type or n type suspended membranes so that the frame may be either n type or p type while the membrane layer is the opposite conductivity type.

Thus it can also be appreciated that the invention is defined as a method of fabricating an integrated microsensor for sensing pressure of a fluid comprising the steps of providing an n-type nitride layer of B, Al, Ga, In, or Tl; disposing a p-type nitride layer of B, Al, Ga, In, or Tl on the n-type nitride layer; photoelectrochemically etching a selected portion of the n-type nitride layer to define a frame formed in the n-type layer and a membrane formed in the p-type layer disposed across the frame; disposing a substrate across the frame opposing the membrane to define a microcavity defined therebetween; fabricating an integrated strain sensor on the membrane; and bowing the membrane. Bowing is controlled and determined by the initial and strain proceeding steps and conditions employed during the growth of the epitaxial crystal material comprised of column III metal nitrides and their alloys.

The invention is still further defined as a method of sensing pressure in a microcavity comprising the steps of: providing the microcavity between a substrate and a membrane, wherein the membrane is comprised of a p-type nitride of B, Al, Ga, In, or Tl and wherein the substrate is comprised at least in part of an n-type nitride of B, Al, Ga, In, or Tl, the microcavity formed between the p-type and n-type layers using a photoelectrochemical etching technique; coupling a strain FET to the membrane thereby bowing the membrane; deforming the membrane by a pressure change in the microcavity; straining the strain FET by deformation of the membrane; and sensing a change in an electrical parameter of the strain FET in response to the pressure change in the microcavity.

The step of straining the strain FET by deformation of the membrane comprises the step of straining a heterojunction in the strain FET, which is an AlGaN/GaN interface in the illustrated embodiment.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIGS. 3a–3e are simplified cross-sectional side view of one methodology whereby the membrane of the invention may be fabricated.

The invention and its various embodiments can now be better understood by turning to the following detailed description of the preferred embodiments which are presented as illustrated examples of the invention defined in the claims. It is expressly understood that the invention as defined by the claims are broader than the illustrated embodiments described below.

DETAILED DESCRIPTION OF THE PREFERRED EMBODIMENTS

Figure 1:
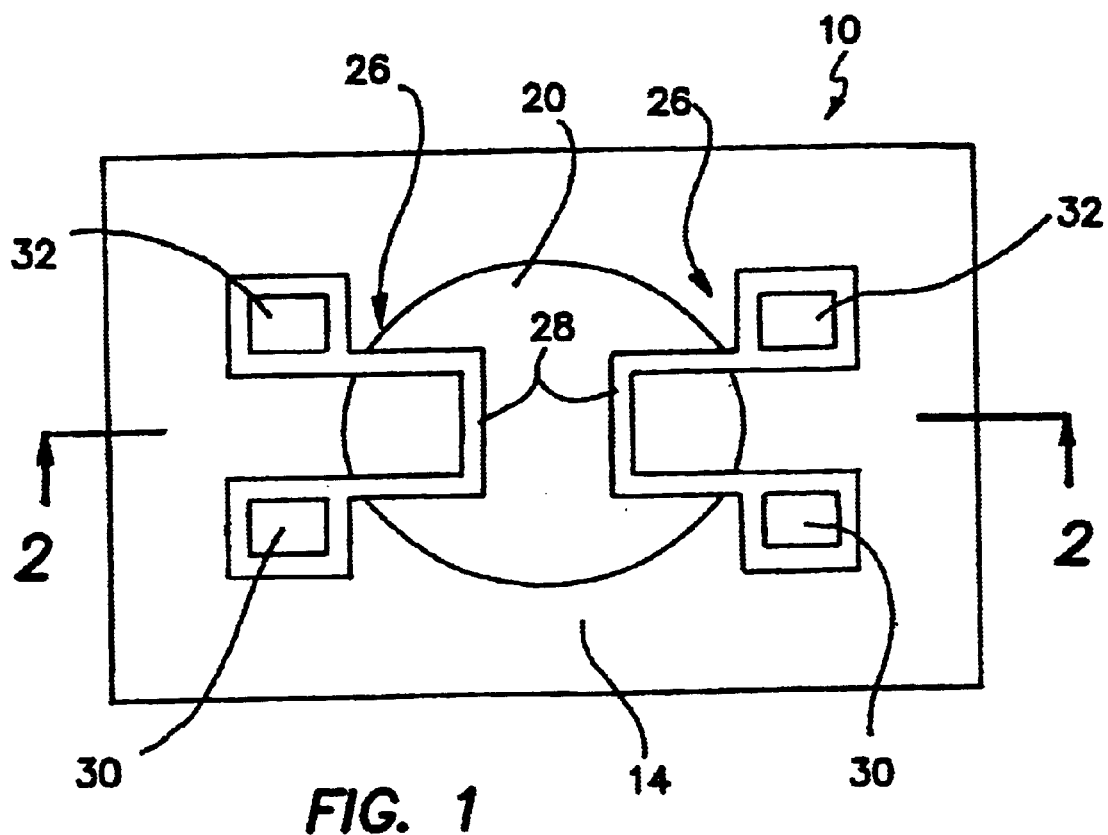
FIG. 1 is simplified diagrammatic side cross-sectional view of the assembled integrated pressure microsensor.
Figure 2:
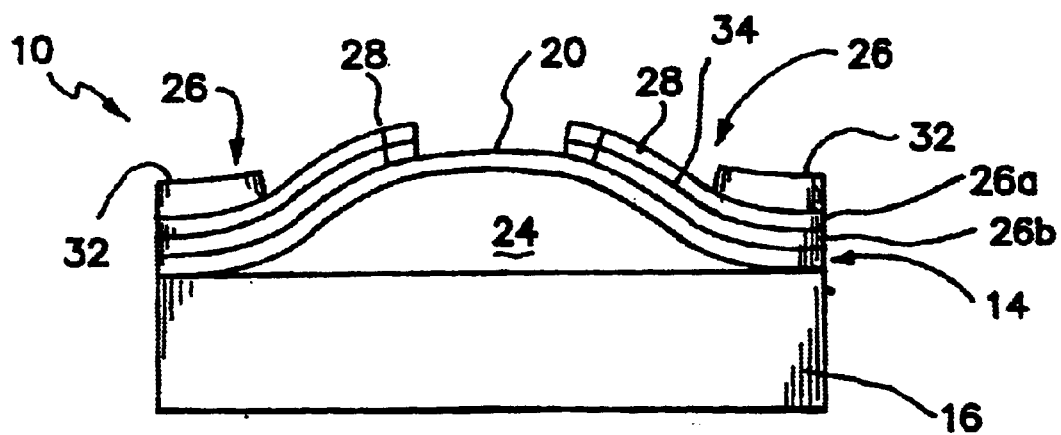
FIG. 2 is a top plan view of the integrated pressure microsensor of FIG. 1.

Electrically active microchannels 24 have been fabricated in p on n GaN material using PEC in conjunction with standard lithographic techniques. A basic design for pressure sensing has been produced as shown in FIGS. 1 and 2 with integration of strain sensing device 26 onto the active area of microchannels 24. The illustrated embodiment of the invention is a pressure sensor 10 employing a GaN microcavity 24 and piezoelectric strain sensor 26 disposed on a suspended nitride membrane 20 as shown in the top plan view of FIG. 1 and in the side cross-sectional view of FIG. 2 seen through lines 2—2 of FIG. 1. Microcavity 24 in the illustrated embodiment is shown as having a circular plan layout but can be fabricated in any shape and at virtually any size within the general theoretical limitations of the fabrication technologies. The development of dopant selective etching of GaN, combined with the optically defined nature of photoelectrochemical etching (PEC), has resulted in the ability to produce arrays of subsurface channels, such as microcavity 24, with three dimensional control of the array geometry. Although not used in the pressure sensor, the electro-active nature of the column III nitrides allows for micropump control of fluid motion, i.e. the nitrides forms of B, Al, Ga, In, Tl or combinations thereof are electrodeformable, they change shape or deform with the application of an electrical potential or through thermal expansion.

The details of how such a suspended nitride membrane 20 can be fabricated are described in copending application, Ser. No. 09/923,483, filed on Aug. 7, 2001, entitled, A METHOD OF MANUFACTURE OF A SUSPENDED NITRIDE MEMBRANE AND A MICROPERISTALTIC PUMP USING THE SAME, and assigned to the same assignee as the present application, which copending application is herein incorporated by reference as if set out in its entirety.

Consider first the method of fabrication of a suspended membrane 20 as shown in FIG. 3a, which is a side cross-sectional view of the beginning step of the method wherein a sapphire substrate 16 is provided. A sacrificial n-GaN base layer 13 is formed on substrate 16 as illustrated in FIG. 3b. A thin p-GaN layer or membrane 12 is grown epitaxially on sacrificial n-GaN base layer 13 as also shown in FIG. 3b. During the PEC process illustrated in FIGS. 3a–3e, a portion of n-GaN base layer 13 is selectively undercut or etched away, leaving the upper p-GaN membrane 20 or the unsupported portion of layer 12 freely suspended. This suspended membrane 20 is formed as follows. A patterned opaque metal mask 22 is deposited on the p-GaN over-layer 12 in FIG. 3c and is used to prevent UV exposure in certain areas of n-GaN base layer 13 as shown in the etch step of FIG. 3d. This allows masked regions of the n-GaN base layer 13 to be locally protected from etching in order to leave structural support or pillars 14 or remaining portion of layer 13 for the thin p-GaN film 12 above. Large p-GaN areas can be undercut in this way, with lateral etch rates approaching 100 $\mu$m/min. The resulting or completed suspended nitride membrane 20 is shown in FIG. 3e.

Photo-electrochemical etching (PEC) of gallium nitride (GaN) depicted diagrammatically in FIG. 3d can be used to fabricate a variety of micro-electromechanical devices. In the PEC etching process, GaN is exposed to ultraviolet radiation (UV) in an aqueous etchant solution. Under these conditions, n-type doped GaN etches rapidly, while p-type GaN remains unaffected. This dopant selectivity of PEC etching, combined with the UV light sensitivity, allows for the fabrication of p-GaN suspended microstructures. To create these structures, a thin p-GaN layer 12 which will become membrane 20 of about 1 $\mu$m thickness is grown epitaxially on a n-GaN base layer 13 formed as shown in FIG. 3b, which is also about 1 $\mu$m thick. During the PEC process, a portion of n-GaN base layer 13 is selectively undercut or etched away, leaving the upper p-GaN membrane 12 freely suspended across a n-GaN frame 14 as shown in FIG. 3e. By using an opaque metal mask 22 to prevent UV exposure in certain areas of n-GaN base layer 13, n-GaN base layer 13 can be locally protected from the etch in order to leave structural frame 14 for the thin film above. Large p-GaN areas can be undercut in this way, with lateral etch rates approaching 100 $\mu$m/min.

An example of one of the devices that can be made with this processing technology is the pressure sensor 10 depicted in the cross-sectional view in FIG. 2 and top plan view in FIG. 1. The sensor 10 is comprised of a p-GaN membrane 20 suspended across a circular n-GaN frame 14 which is anchored to a rigid substrate 16 below frame 14. As depicted in FIG. 2, the p-GaN membrane 20 bows upward away from substrate 16 and in order to relieve thermal and lattice mismatch between the epilayer or membrane 20 and substrate 16 resulting from the epitaxial growth of membrane 20. This bowing substantially increases the volume of the enclosed microchannel 24 defined between membrane 20 and substrate 16 below. At the center of the bow, the membrane-to-substrate distance is typically in the range of 10% of the diameter of microcavity 24. Microcavity volumes of 0.1 $\mu$l to tens of $\mu$ls can readily be fabricated using the methodology of the invention.

The invention takes advantage of the piezoelectric properties of column III nitrides to monitor in situ the pressures within fluid channels 24 thereby enabling real-time feedback and control of fluid flow, pressure, and other related hydraulic measure within these microchannels and cavities 24. The invention is based on the fact that variations in strain within an AlGaN/GaN heterostructure 26 produces variations in the density of the two dimensional electron gas at the AlGaN/GaN interface. AlGaN/GaN heterostructure 26 as shown best in FIG. 2 is comprised of a horizontal layer 26a of AlGaN on top of a horizontal layer 26b of GaN configured into a U-shaped FET 26, which has a cantilever loop portion 28 extending out onto and riding on top of membrane 20. A deformation of the loop portion 28 results in large shifts in the conductivity between properly positioned contacts 30 and 32 as best shown in the simplified top plan view of FIG. 1. The number of carriers at the AlGaN/GaN interface 34 between layer AlGaN layer 26a and GaN layer 26b is determined by the piezoelectric field within the AlGaN layer 26a. By deforming this bilayer 26a and 26b, a change in the piezoelectric field is induced leading to a change in electrons within this interfacial layer, and hence a change in the electric current results. The metal pads 30 and 32 provide a contact to what functions as the source and drain of the FET heterostructure 26. The deformed and extended loop 28 extending onto membrane 20 acts as the gate of the FET 26 by virtue of the piezoelectric charge created at the AlGaN/GaN interface 34. The strain induced into membrane 20 by the pressure in the underlying microcavity 24 is then sensible as a signal change detected in FET 26.

Integration of this strain-FET 26 onto the walls of a microcavity 24 results in a very sensitive measurement of pressure differences between inside and outside of the microcavity 24 via the deflection of the microcavity upper walls or membrane 20 when a pressure gradient is present. Pressures in the range of 1 psi to 100 psi are within the range of sensor 10 with changes as small as 0.1 psi being detectable.

This invention has a wide range of new and useful applications, which are almost countless and include, but are not limited to: dynamic real time measurement and control of pressure in closed systems; replacement of bulky mechanical pressure sensors for a range of applications from altimeters to barometers; and real time monitoring for control and adjustment of refractive optics to account for variations in atmospheric pressure in active optic techniques. In addition, the use of semiconducting materials allows for easy integration into digital circuits for computer controlled applications.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An integrated microsensor for sensing pressure of a fluid comprising:

a micromachined membrane having a peripheral edge, which membrane is bowed by stress formed in the membrane during its fabrication;

a substrate coupled to at least a portion of said peripheral edge to define a microcavity between said substrate and membrane to which microcavity said fluid whose pressure is to be sensed is communicated; and an integrated piezoelectric strain sensor coupled to said micromachined membrane to generate a signal responsive to deformation of said membrane and hence responsive to said pressure of said fluid in said microcavity, where said integrated strain sensor comprises a strain-FET comprised of an AlGaN/GaN heterostructure having an AlGaN/GaN interface where deformation of said membrane is coupled as strain to said AlGaN/GaN interface.

2. The integrated microsensor of claim 1 where said integrated strain sensor comprises an integrated circuit strain sensor fabricated in an integrated manner with said membrane and substrate.

3. The integrated microsensor of claim 1 where said membrane is composed of a nitride of B, Al, Ga, In, Tl or combinations thereof.

4. The integrated microsensor of claim 1 where said membrane is comprised of p-type GaN.

5. The integrated microsensor of claim 1 further comprising a frame coupled to said peripheral edge of said membrane and where said frame is coupled to said substrate, wherein said frame assists in enlarging said microcavity.

6. The integrated microsensor of claim 5 where said membrane is comprised of p-type GaN and said frame is comprised of n-type GaN.

7. The integrated microsensor of claim 6 where said micromachined membrane is fabricated using a photoelectrochemical etching technique.

8. The integrated microsensor of claim 1 where said micromachined membrane is fabricated using a photoelectrochemical etching technique.

9. The integrated microsensor of claim 1 where said membrane is bowed by fabrication of said integrated strain sensor thereon to create stresses across said membrane.

10. A method of sensing pressure in a microcavity comprising:

providing said microcavity between a substrate and a membrane, wherein said membrane is comprised of a p-type nitride of B, Al, Ga, In, or Tl and wherein said substrate is comprised at least in part of an n-type nitride of B, Al, Ga, In, or Tl, said microcavity formed between said p-type and n-type layers using a photoelectrochemical etching technique;

providing an integrated strain-FET comprised of an AlGaN/GaN heterostructure having an AlGaN/GaN interface where deformation of the membrane is coupled as strain to said AlGaN/GaN interface coupling the strain FET to said membrane thereby bowing said membrane;

deforming said membrane by a pressure change in said microcavity;

straining said strain FET by deformation of said membrane, where straining said strain FET by deformation of said membrane comprises straining a heterojunction in said strain FET; and sensing a change in an electrical parameter of said strain FET in response to said pressure change in said microcavity.

* * * * *